UNITED STATES PATENT OFFICE.

GEORGE E. VANDERBURGH, OF MAMARONEC, NEW YORK.

IMPROVEMENT IN TREATING FELDSPAR TO OBTAIN USEFUL PRODUCTS.

Specification forming part of Letters Patent No. 43,534, dated July 12, 1864.

*To all whom it may concern:*

Be it known that I, GEORGE E. VANDERBURGH, of Mamaronec, in the county of Westchester and State of New York, have succeeded in reducing feldspar to a liquid or gelatinous state, and thereby producing a new composition of matter, which may be used as a whole for various useful purposes, or may be separated by the simple action of gravity into two distinct parts of a greater and a less degree of liquidity, and each possessing different and highly useful qualities; and I do hereby declare that the following is a full, clear, and exact description of my process of liquefying feldspar and of the article or composition of matter produced by such liquefaction, as well as an enumeration of some of the useful purposes to which the said product may be applied, both as a whole or when separated by the action of gravity into two distinct parts.

I take the feldspar as it comes from the mine, and, having submitted it to any disintegrating process which will reduce it to the form of a powder, I thoroughly mix therewith from ten to thirty per cent. of soda-ash or its equivalent, and complete the incorporation of the two substances by the process of vitrifaction. This vitrified substance in turn is disintegrated by any suitable process, and submitted while in a moist condition to the action of superheated steam in a suitable digester, substantially in the manner described in my patent of May 29, 1860, reissued April 1, 1862.

The effect of this treatment is to reduce the substance treated to a liquid or gelatinous state. This liquid or gelatinous substance as an entirety may be advantageously used as a substitute for oils in the production of paints, and also as an ingredient in the manufacture of soaps. If allowed to stand undisturbed for a sufficient length of time, this substance is separated into two parts of nearly equal volume, one of which parts, by reason of its greater specific gravity, sinks to the bottom of the vessel in which the whole is contained, and presents an opaque appearance, while the upper portion of said liquid is rare and transparent.

This opaque and more dense substance possesses many advantages as a filling for the space between the outer and inner casings of iron safes. The more liquid portion forms a good sizing for paper, cloth, &c., as well as a coating for the interior of oil-barrels, &c.

Having thus fully described my invention, what I claim as new, and desire to secure by Letters Patent, is—

A new and useful composition of matter produced by submitting feldspar to substantially the treatment herein described.

The foregoing specification signed by me this 8th day of April, 1864.

GEORGE E. VANDERBURGH.

In presence of—
 GEO. A. MAYHAM,
 CHARLES DRAKE.